(12) United States Patent
Dawson

(10) Patent No.: US 6,217,982 B1
(45) Date of Patent: Apr. 17, 2001

(54) THERMOPLASTIC POLYMER ALLOY COMPOSITION

(75) Inventor: Robert Louis Dawson, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/168,488

(22) Filed: Oct. 8, 1998

Related U.S. Application Data

(60) Provisional application No. 60/061,598, filed on Oct. 10, 1997.

(51) Int. Cl.$^7$ ................................................ B32B 27/32
(52) U.S. Cl. ..................... 428/151; 428/521; 428/522; 428/904; 264/175; 525/95; 525/97; 525/98; 525/55; 525/191; 525/208; 525/221; 525/222
(58) Field of Search ...................... 525/55, 95, 97, 525/98, 191, 208, 221, 222; 264/175; 428/904, 151, 521, 522

(56) References Cited

U.S. PATENT DOCUMENTS

| | | | |
|---|---|---|---|
| 3,835,201 | * 9/1974 | Fischer | 260/897 A |
| 4,871,810 | * 10/1989 | Saltman | 525/133 |
| 4,945,005 | * 7/1990 | Aleckner, Jr. et al. | 428/500 |
| 4,968,752 | * 11/1990 | Kawamoto et al. | 525/194 |
| 4,997,720 | * 3/1991 | Bourbonais et al. | 428/500 |
| 5,051,478 | * 9/1991 | Puydak et al. | 525/195 |
| 5,206,294 | * 4/1993 | Dawson | 525/196 |
| 5,721,314 | * 2/1998 | Hausmann | 525/71 |

FOREIGN PATENT DOCUMENTS

WO 95/32241   11/1995   (WO) ............................ C08L/23/08

OTHER PUBLICATIONS

PCT International Search Report for International application no. PCT/US98/21400.

* cited by examiner

*Primary Examiner*—Robert Dawson
*Assistant Examiner*—Kuo-Liang Peng

(57) ABSTRACT

A calenderable thermoplastic polymer alloy composition made by blending ethylene/alkyl (meth)acrylate with a blend of polypropylene, ethylene copolymer ionomer resin, ethylene/glycidyl acrylate or methacrylate copolymer, and uncrosslinked ethylene propylene rubber.

13 Claims, No Drawings

THERMOPLASTIC POLYMER ALLOY COMPOSITION

This application claims the benefit of U.S. Provisional Application No. 60/061,598, filed Oct. 10, 1997.

FIELD OF THE INVENTION

This invention relates to thermoplastic polymer alloy compositions which exhibit excellent low temperature properties coupled with heat and scuff resistance and furthermore can be processed by calendering.

BACKGROUND OF THE INVENTION

U.S. Pat. No. 5,206,294, which is incorporated herein by reference, describes thermoplastic polymer alloy compositions (hereinafter referred to as "ETP-TPO's") that fulfilled a need in the art, especially in the automotive field, for a material which combines the low and high temperature resistance properties of plasticized PVC, can be recycled easily, and exhibits scuff resistance and softness equal or superior to that of plasticized PVC. These ETP-TPO's have particular utility in automobile instrument panel skins since they provide excellent definition and grain retention on thermoforming, which is the most common method of forming such skins. These compositions also work very well in extrusion, typically used to prepare the embossed films used in the thermoforming step.

It is desirable to have an ETP-TPO that processes well by calendering because many commercial films used to prepare instrument panel skins are prepared by calendering. The ETP-TPO of U.S. Pat. No. 5,206,294, however, does not calender well exhibiting, for example, behavior such as sticking to the rolls or splitting between two rolls.

SUMMARY OF THE INVENTION

The present invention provides a calenderable ETP-TPO film (one that processes well by calendering), calendered sheet made therefrom and uses for such calenderable film and calendered sheet. The film and sheet may be a free-standing material or part of a laminated structure. It may be filled or unfilled. It may be embossed or non-embossed. It is useful in automotive and non-automotive applications including essentially all applications where flexible vinyl sheet has been or can be used.

The calenderable ETP-TPO of the present invention comprises (a) thermoplastic alloy composition comprising a melt blend of
  i) 10–40 wt. % polypropylene,
  ii) 15–55 wt. % uncrosslinked ethylene propylene copolymer rubber,
  iii) 20–60 wt. % of an ionomeric copolymer of ethylene, an alpha,beta-unsaturated $C_3$–$C_8$ carboxylic acid, and optionally one or more softening comonomers copolymerizable with ethylene, and
  iv) 1–5 wt. % of a copolymer of ethylene and glycidyl acrylate or glycidyl methacrylate, and
(b) 1–15 parts by weight per hundred parts of the thermoplastic alloy composition of an ethylene/alkyl (meth)acrylate copolymer.

DETAILED DESCRIPTION OF THE INVENTION

To provide an ETP-TPO with desired processing behavior on a mill or calender, about 1 to about 15 parts of an ethylene/alkyl (meth)acrylate copolymer is added to 100 parts by weight of a thermoplastic alloy composition comprising a melt blend of the following components (weight percents based on the total of the four components):
  i) about 10 to about 40 percent by weight (wt. %), preferably about 15 to about 30 wt. %, polypropylene,
  ii) about 15 to about 55 wt. %, preferably about 35 to about 50 wt. %, uncrosslinked ethylene propylene copolymer rubber,
  iii) about 20 to about 60 wt. %, preferably about 25 to about 35 wt. %, ionomeric copolymer of ethylene and an alpha,beta-unsaturated $C_3$–$C_8$ carboxylic acid, and optionally one or more softening comonomers copolymerizable with ethylene, and
  iv) about 1 to about 5 wt. %, preferably about 2 to about 3 wt. %, copolymer of ethylene and glycidyl acrylate or glycidyl methacrylate.

The thermoplastic alloy compositions are generally prepared by melt blending the polymeric components under high shear conditions, for example in an extruder. The various ingredients may first be combined with one another e.g., in a pellet blend, or they may be combined with one another via simultaneous or separate metering of the various components. They may also be divided and blended in one or more passes into separate sections of the mixing equipment.

The ethylene/alkyl (meth)acrylate copolymer can be added to thermoplastic alloy composition either in the mixing step used to prepare the thermoplastic alloy composition or in a later melt-mixing step in an extruder, Banbury mixer, mill, or other mixing device.

The resultant compositions may be formed into calenderable films and calendered to make calendered sheets. The film and sheet is useful as free-standing material or as part of a laminated structure. The sheet may be embossed with a grain pattern. Such embossed sheet has excellent grain retention and thus has particular use in simulated leather applications and in instrument panel skins and door skins for automobiles. Fillers useful in filed applications include flame-retardant fillers such as calcium carbonate, mica, talc and glass. Filler levels can range from 0 to 80%. Due to its improved damage and penetration resistance, it has utility in roofing membranes and geomembranes.

Automotive uses include skins for instrument panels and for other locations such as door panels, simulated leather coverings, headliners, mats, and other grained and non-grained applications where flexible vinyl sheet has been used. Non-automotive uses include flooring systems and tiles, simulated leather coverings and other grained covering materials for furniture for example, geomembranes, and single-ply roofing material. The film and sheet are particularly useful in the form of a soft bottom layer of non-automotive flooring systems and tile. In those cases where the formulation is used as a layer in a multilayer structure, it would normally be adhered to the other layers by a tie layer except in those cases where the other layers are polypropylene based and an adhesion could be achieved by coextrusion or co-lamination. Thickness of the sheet can range from 0.1 to 2 mm.

The components employed in the present invention are as follows:

Polypropylene

The polypropylene component preferably employed is crystalline polypropylene and is intended to include, in addition to the homopolymer, those polymers that also contain minor amounts, usually not greater than 15 weight percent, of other alpha-olefins, e.g. those containing 2–8 carbon atoms, such as ethylene, butene, octene, etc. The polypropylene polymers useful in this invention have melt indices in the range of from about 0.07–80 dg/minute.

Uncrosslinked Ethylene Propylene Copolymer

The uncrosslinked ethylene/propylene copolymer rubber may be a polymer with two or more monomers but preferably is a terpolymer such as an ethylene/propylene/nonconjugated diene copolymer or ethylene/propylene/ethylidene norbornene (EPDM). The nonconjugated dienes can contain from 6–22 carbon atoms having at least one readily polymerizable double bond. The uncrosslinked ethylene/propylene copolymer rubber contains about 60–80 weight percent, usually about 65–75 weight percent ethylene. The amount of nonconjugated diene is generally from about 1–7 weight percent, usually 2–5 weight percent.

EPDM copolymers that are especially preferred are ethylene/propylene/1,4-hexadiene, ethylene/propylene/dicyclopentadiene, ethylene/propylene/norbornene, ethylene/propylene/methylene-2-norbornene, and ethylene/propylene/1,4-hexadiene/norbornadiene copolymers. It is important that the ethylene propylene copolymer rubber be non-crosslinked because this imparts enhanced scuff resistance to the polymer alloys.

The EPDM copolymers (copolymers being polymers with two or more monomers) can be made using metallocene technology or non-metallocene processes well known in the art.

Ionomeric Copolymer

The ionomeric copolymer preferably employed is of ethylene, an unsaturated $C_3$–$C_8$ carboxylic acid, and optionally one or more softening comonomers copolymerizable with ethylene. Acrylic and methacrylic acids are preferred acid comonomers. The softening comonomer can be an alkyl acrylate selected from the group consisting of n-propyl-, iso-butyl-, n-butyl-, n-octyl-, 2-ethylhexyl-, and 2-methoxyethyl-acrylates. The preferred alkyl acrylates are isobutyl-, n-butyl-, 2-ethylhexyl-, and 2-methoxyethyl-acrylates. The softening comonomer can also be an alkyl vinyl ether selected from the group consisting of n-butyl-, n-hexyl-, 2-ethylhexyl-, and 2-methoxyethyl-vinyl ether. The preferred alkyl vinyl ethers are n-butyl vinyl ether and n-hexyl vinyl ether. The copolymer is about 10 to 70% neutralized with metal ions selected from groups Ia, Ib, IIa, IIIa, IVa, VIb, and VIII of the Periodic Table of Elements such as sodium, potassium, zinc, calcium, magnesium, lithium, aluminum, nickel, and chromium. Preferably the copolymer has from about 35 to about 70% of the carboxylic acid groups ionized by neutralization with metal ions selected from the group consisting of sodium, potassium, zinc, calcium, and magnesium.

Ethylene/Glycidyl (meth)acrylate

The ethylene/glycidyl (meth)acrylate component of the ETP-TPO is an ethylene/glycidyl acrylate or ethylene/glycidyl methacrylate copolymer.

Optionally, and preferably, the ethylene/glycidyl acrylate or ethylene/glycidyl methacrylate copolymer contains copolymerized units of an alkyl acrylate or an alkyl methacrylate having 1–6 carbon atoms. The ethylene/glycidyl acrylate or ethylene/glycidyl methacrylate copolymer contains 60–88 weight percent ethylene and 1–12 weight percent glycidyl acrylate or glycidyl methacrylate. Representative alkyl acrylates and alkyl methacrylates that are used in the copolymer include methyl acrylate, ethyl acrylate, propyl acrylate, n-butyl acrylate, isobutyl acrylate, hexyl acrylate, methyl methacrylate, ethyl methacrylate, propyl methacrylate, butyl methacrylate, and hexyl methacrylate. Ethyl acrylate is preferred and n-butyl acrylate is especially preferred.

The ethylene/glycidyl (meth)acrylate, preferably containing an alkyl acrylate of 1–6 carbon atoms, can be prepared by direct polymerization, for example, copolymerizing ethylene, an alkyl acrylate, and glycidyl methacrylate or glycidyl acrylate in the presence of a free-radical polymerization initiator at elevated temperatures, generally 100–270° C., usually 130–230° C., and at elevated pressures, i.e. 140–350 MPa. The most preferred ethylene/glycidyl(meth)acrylate copolymers that are used in this invention are copolymers of ethylene, ethyl acrylate, glycidyl methacrylate, and, especially, ethylene, n-butyl acrylate, and glycidyl methacrylate.

Ethylene/Alkyl (Meth)Acrylate

The ethylene/alkyl (meth)acrylate copolymer preferably contains from about 5 to about 36 percent alkyl (meth) acrylate monomer wherein the alkyl group preferably is methyl but can be a higher alkyl group up to octyl. These copolymers can be prepared by the various methods known in the art such as high pressure free radical polymerization.

EXAMPLES

All parts in the following examples are based on weight.

Comparative Example 1

An alloy was prepared in a twin-screw extruder set at 180° C. and 235 rpm from a blend of polymers containing 18 parts polypropylene homopolymer (PROFAX®6523), 51 parts of ethylene propylene 1,4-hexadiene elastomeric terpolymer having a Mooney viscosity ($ML_{(1+4)}$ at 121° C.) of 25 (NORDEL®6694), 29 parts ethylene n-butyl acrylate methacrylic acid terpolymer partially neutralized with zinc (SURLYN®9320), 2 parts of ethylene n-butylacrylate glycidyl methacrylate terpolymer (ELVALOY®AS), and 0.5 parts of a phenolic antioxidant (IRGANOX®1010).

The resulting alloy was milled on a hot mill set at 178–184° C. It stuck to the rolls and could be removed only with the aid of a doctor knife (heavy metal scraper).

Example 1

An alloy was prepared as above from 18 parts PROFAX®6523, 50 parts NORDEL®6694, 28 parts of SURLYN®9320, 2 parts of ELVALOY®AS, 2 parts of a masterbatch of equal parts ethylene methyl acrylate copolymer and carbon black (AMPACET®19238), 0.20 parts IRGANOX®1010, 0.25 parts each of UV stabilizers TINUVIN®770 and TINUVIN®328.

The resulting alloy was milled on a hot mill set at 177–180° C. The sample was easily removed by hand from the rolls as a single sheet.

Example 2

A sample of the alloy prepared in Comparative Example 1 was put on a hot mill set at 174–175° C. It stuck to the rolls and split to both rolls. To it was added on the mill 10 parts of an ethylene methyl acrylate copolymer containing 24% methyl acrylate (OPTEMA®TC-113). As the EMA copolymer was mixed into the alloy, the polymer mixture became a continuous sheet on one roll and could be easily removed by hand from the roll as a continuous sheet.

Comparative Example 2

An alloy was prepared as in Comparative Example 1 from a mix of 18 parts propylene ethylene copolymer (Huntsman AP6112HS), 51 parts of NORDEL®6694, 29 parts of SURLYN®9320, 2 parts of ELVALOY®AS, and 0.5 parts of IRGANOX®1010.

This alloy was milled on a hot mill at 177–179° C. It stuck to the rolls and could be removed only with a doctor blade.

Example 3

An alloy was prepared as in Comparative Example 1 from a mix of 18 parts AP6112HS, 45 parts of NORDEL®6694, 25 parts of SURLYN®9320, 10 parts of OPTEMA®TC-113, 2 parts ELVALOY®AS, and 0.3 parts IRGANOX®1010.

The resulting alloy was first milled on a mill set at 310° F. (155° C.). It gave a smooth band on one roll which was easily removed as sheet from the roll. It was then transferred to a 4 roll calender where, after suitable adjustment of roll temperatures, it gave a good quality continuous sheet. The optimum roll temperature found were: rolls 1&2—340° F. (170° C.), roll 3 at 350° F. (177° C.), and roll 4 at 312° F. (156° C.).

Example 4

An alloy was prepared as in Comparative Example 1 from 18 parts propylene-ethylene copolymer with flex modulus of 1150 MPa (Huntsman AP 6112-HS), 51 parts ethylene, propylene, 1,4-hexadiene elastomeric terpolymer having a Mooney viscosity ($ML_{(2+10)}$ at 121° C.) of 45 (NORDEL®3681), 29 parts of zinc ionomer from base resin containing 10% isobutyl acrylate and 10% methacrylic acid (SURLYN®1857), 10 parts of an EMA polymer containing 35% methyl acrylate (LOTRYL®35 MA 05), 2 parts of ELVALOY®AS, and 0.5 parts of IRGANOX®1010.

The resulting alloy was milled on a hot mill at 174–182° C. The sample was easily removed from the mill as a single sheet.

What is claimed is:

1. A calenderable composition comprising
   (a) thermoplastic alloy composition comprising a melt blend of
      i) 10–40 wt. % polypropylene,
      ii) 15–55 wt. % uncrosslinked ethylene propylene copolymer rubber,
      iii) 20–60 wt. % of an ionomeric copolymer comprising ethylene and an alpha,beta-unsaturated $C_3$–$C_8$ carboxylic acid, and
      iv) 1–5 wt. % of a copolymer of ethylene and glycidyl acrylate or glycidyl methacrylate, and
   (b) 1–15 parts by weight per hundred parts of the thermoplastic alloy composition of an ethylene/alkyl (meth)acrylate copolymer.

2. The composition of claim 1 wherein the ethylene/alkyl (meth)acrylate copolymer is ethylene/methyl acrylate.

3. The composition of claim 1 or 2 wherein the polypropylene is present in an amount of 15–25 wt. %.

4. The composition of claim 1 or 2 wherein the uncrosslinked ethylene propylene copolymer rubber is present in an amount of 25–50 wt. %.

5. The composition of claim 1 or 2 wherein the ionomeric copolymer of ethylene and an alpha,beta-unsaturated $C_3$–$C_8$ carboxylic acid is present in an amount of 25–35 wt. %.

6. The composition of claim 1 or 2 wherein the copolymer of ethylene and glycidyl acrylate or glycidyl methacrylate is present in an amount of 2–3 wt. %.

7. The composition of claim 1 or 2 wherein the ethylene propylene rubber is a copolymer of ethylene, propylene, and 1,4-hexadiene.

8. The composition of claim 1 or 2 wherein the copolymer of ethylene and glycidyl acrylate or glycidyl methacrylate is an ethylene/n-butyl acrylate/glycidyl methacrylate copolymer.

9. The composition of claim 1 or 2 wherein the ionomeric copolymer comprises contains n-butyl or isobutyl acrylate as a softening comonmer.

10. A calendered sheet comprising
    (a) thermoplastic alloy composition comprising a melt blend of
       i) 10–40 wt. % polypropylene,
       ii) 15–55 wt. % uncrosslinked ethylene propylene copolymer rubber,
       iii) 20–60 wt. % of an ionomeric copolymer comprising ethylene and an alpha,beta-unsaturated $C_3$–$C_8$ carboxylic acid, and
       iv) 1–5 wt. % of a copolymer of ethylene and glycidyl acrylate or glycidyl methacrylate, and
    (b) 1–15 parts by weight per hundred parts of the thermoplastic alloy composition of an ethylene/alkyl (meth)acrylate copolymer.

11. An automotive skin for use on interior panels comprising the calendered sheet of claim 10.

12. An artificial leather comprising the calendered sheet of claim wherein the sheet is embossed with a grain pattern.

13. A membrane comprising the calendered sheet of claim 10.

* * * * *

UNITED STATES PATENT AND TRADEMARK OFFICE
CERTIFICATE OF CORRECTION

PATENT NO. : 6,217,982 B1
DATED : April 17, 2001
INVENTOR(S) : Robert Louis Dawson It is certified that error appears in the above-identified patent and that said Letters Patent is hereby corrected as shown below:

<u>Column 6, claim 12,</u>
Line 44, change "of claim wherein the sheet is embossed with a grain pattern." to -- of claim 10 wherein the sheet is embossed with a grain pattern. --

Signed and Sealed this

Thirtieth Day of October, 2001

Attest:

NICHOLAS P. GODICI
*Attesting Officer*     *Acting Director of the United States Patent and Trademark Office*